April 19, 1949.  G. L. N. MEYER  2,467,683
FILLER VALVE
Filed Oct. 27, 1945
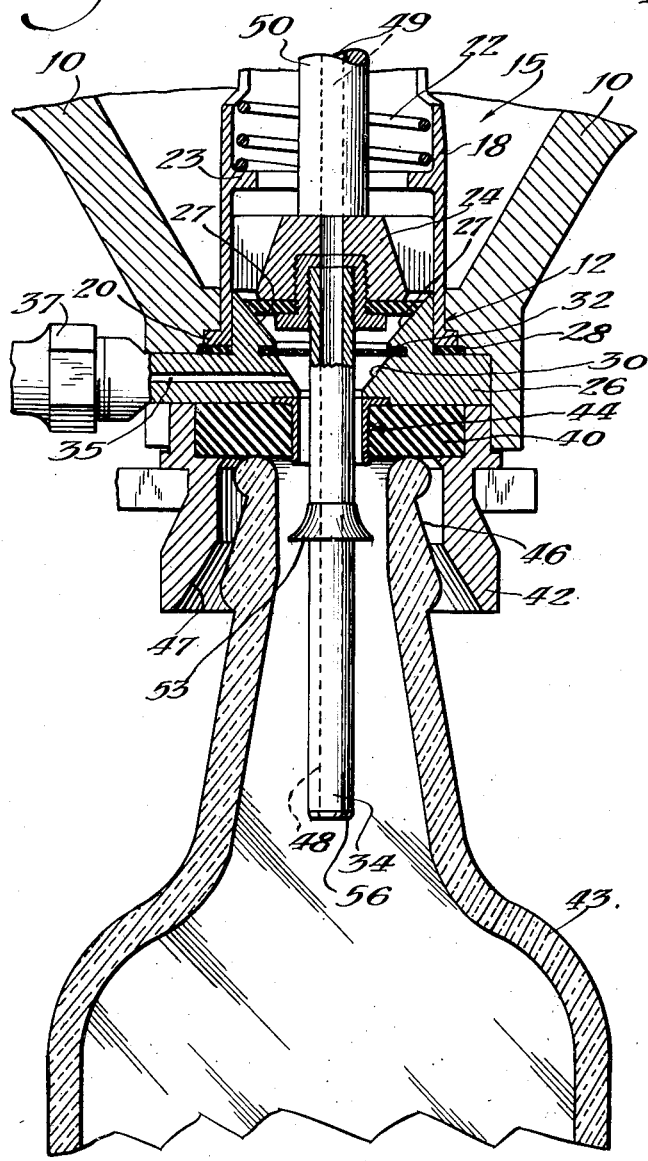
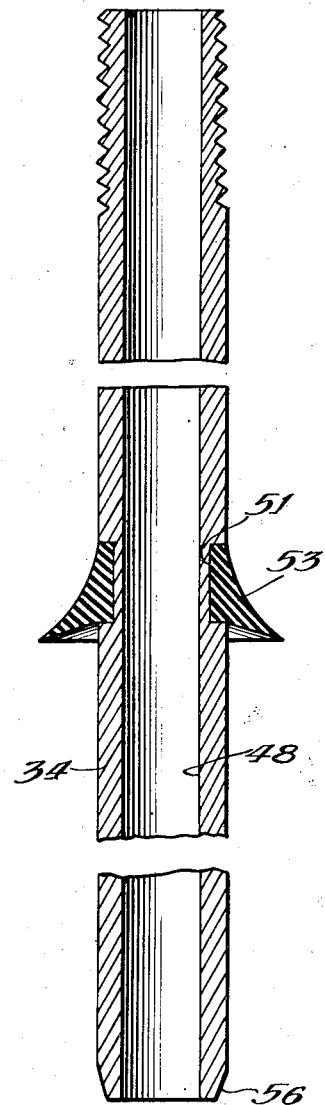
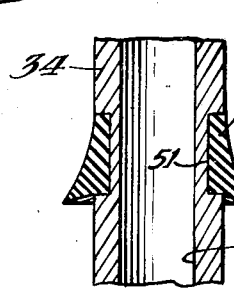
Inventor:
George L. N. Meyer
By Eugene H. Simpson
Attorney

Patent text

Patented Apr. 19, 1949

2,467,683

UNITED STATES PATENT OFFICE 2,467,683

FILLER VALVE

George L. N. Meyer, Milwaukee, Wis.

Application October 27, 1945, Serial No. 625,067

2 Claims. (Cl. 226—109)

This invention relates to bottle filler valves and more particularly to a vent tube and spreader element for a filler valve.

In filler valves heretofore made, the vent tube has been provided with a rigid spreader element, which when the bottles were not properly centered on the lifting stirrup, would contact the lip of the bottle and either break the bottle or bend the stem and injure the spreader.

Another difficulty encountered in vent tubes and spreader elements now being made, is that the liquid tends to adhere to the spreader and flow down the tube rather than down the inner surface of the bottle. This adhesion to the spreader causes choking of the vent tube and slow filling and results in "shorts" or partially filled bottles.

One object of the present invention is to provide a vent tube for a filler valve which will not cause bottle breakage.

Another object is to provide a vent tube for a filler valve which can be manufactured economically.

Another object is to provide a spreader element for a filler valve which may be replaced to vary the rate of filling the bottle.

Another object is to provide a filler valve in which the danger of bending the vent tube is reduced to a minimum.

A further object is to provide a filler valve in which the danger of damaging the vent tube and spreader element is reduced to a minimum.

A further object is to provide a vent tube for a filler valve with an improved spreader element thereon.

A further object is to provide a spreader element for which the liquid will exhibit preferential wetting or adhesion for glass and which will result in all the liquid being deflected off the spreader and onto the interior of the neck of the bottle.

A further object is to provide a filler valve which will prevent choking of the vent tube.

A further object is to provide a filler valve which will reduce the number of "shorts" or partially filled bottles delivered by the machine.

A still further object is to increase the capacity of the bottle filling machine.

Other objects will become apparent upon considering the following specification, which, when taken in connection with the accompanying drawings, illustrates one form of the invention.

In terms of broad inclusion, the invention comprises a filler valve, a vent tube having an aperture therethrough adapted to vent air from within the container to be filled and a yieldable spreader element mounted on the vent tube.

In the drawings:

Fig. 1 is an elevational cross-sectional view through the lower part of a filler bowl and filler valve showing the vent tube and spreader element;

Fig. 2 is an enlarged cross-sectional view of the vent tube and spreader element; and Fig. 3 is a cross-sectional elevational view showing a narrower spreader.

Referring to the drawings a filler bowl 10, the outer periphery of which is shown, is mounted to rotate about a center (not shown).

The lower edge of the periphery of the bowl 10 has a plurality of apertures 12 spaced thereabout which receive filler valves, generally designated 15, and of which only the lower portion thereof is shown.

The filler valve has a cage element 18 which has an outstanding collar 20 at the lower end which abuts the lower end of the aperture 12. The cage 18 contains a light spring 22 which abuts a flange 23 in the cage 18 and urges a valve element 24 into open position, the valve 24 being retained in closed position by the pressure of the liquid above it.

A valve seat 26 having a tapered seating surface 27 is mounted in the lower end of the aperture 12, and has the seating surface projecting up into the lower end of the cage 18. A rubber gasket 28 is inserted between the seat 26, the collar 20 and the bowl 10 to prevent leakage. The valve seat 26 has an aperture 30 therethrough with a screen 32 mounted in the seat 26 at the upper end of the aperture 30 and below the surface 27. The aperture 30 tapers inwardly and downwardly to guide the beverage flowing past the valve closure 24 and through the screen inwardly onto a vent tube 34. A snifter opening 35 is formed in the valve seat 26 and is controlled through a snifter valve 37 by a cam (not shown).

A bottle seal 40 is mounted in a recess in a bottle centering ring 42, and has a passage 44 through the center of the seal 40. A nipple 46 is mounted in the passage 44, the interior of which alines with the tapered aperture 30 in the seat 26.

The lower end of the centering ring 42 has a tapered opening 47 which guides bottles 43 which may become misaligned on the stirrup (not shown).

The vent tube 34 is mounted centrally in the bottom of the valve 24 and has a longitudinal opening 48 therethrough, which, when the vent tube 34 is mounted in the valve 24 alines and communicates with an opening 49 in a valve guide stem 50.

The vent tube 34 has a reduced exterior 51 intermediate its ends on which is mounted a spreader element 53. The upper edge of the spreader element forms a continuation of the surface of the vent tube, the outer surface of the spreader flaring outward to direct liquid traveling down the vent tube onto the inner surface of the neck of the bottle 43.

The spreader element 53, is made, preferably, of rubber or other yieldable material so that in the event the bottle strikes the spreader as the bottle is being raised by the stirrup, the spreader will yield and not break the bottle.

It has also been found that there is less adhesion between the surface of the rubber spreader and the liquid than in spreaders heretofore used, with the result that the liquid exhibits preferential adhesion or wetting for the glass and causes less liquid to adhere to the rubber spreader and consequently the liquid flows onto the inside surface of the neck of the bottle and prevents choking of the vent tube thus eliminating "shorts."

The spreader element 53 may be made in various maximum skirt widths to form an impediment to the flow of the liquid downwardly and thus regulate the rate of filling the bottles. The rubber spreader permits ready change from one width spreader element to another width element.

The lower end of the tube is tapered inwardly as shown at 56 to cooperate with the taper 47 and guides the vent tube into the interior of the bottle 43.

In operation the bottle is delivered from a bottle washer to the filling machine. A star wheel (not shown) distributes the bottles accurately onto stirrups (not shown) which raise the bottles 43 upwardly with the neck of the bottle normally being centered with respect to the vent tube 34. The upper lip of the bottle contacts the sealing ring 40 and is held in gas tight engagement therewith.

When the bottle is in position with the neck in sealing engagement with the sealing ring 40, a cam (not shown) opens a valve (not shown) allowing the counterpressure in the bowl 10 to enter the bottle through the ports 48 and 49. When the pressure within the bottle 43 is equal to the counterpressure within the bowl, the spring 22 opens the valve 24 permitting the liquid to flow through the cage 18, through the screen 32, down the outside of the vent tube 34 and onto the spreader element 53, which directs the liquid outwardly onto the interior of the neck of the bottle 43. As the bottle 43 fills with liquid, the air and other gas in the top of the bottle pass upwardly through the openings 48 and 49 into the filler bowl 10.

When the level of the beverage in the bottle rises above the bottom of the vent tube 34, the gas in the bottle can no longer escape through the opening 48—49 into the top of the bowl. This trapping of the gas in the bottle causes the pressure in the top of the bottle, above the beverage, to equal the pressure of the liquid entering the bottle. When the pressure is thus equalized, the surface tension of the liquid prevents the flow of the beverage through the small holes in the screen, thus stopping the flow of beverage at the level of the bottom of the vent tube 34. A cam subsequently shuts the valve (not shown) at the top of the opening 49 and simultaneously shuts the valve 24. The bottle is then lowered by the stirrup and removed for capping.

In the event the star wheel does not properly center the bottle 43 on the stirrup, the upper lip of the bottle is likely to strike the spreader element 53. In that event the rubber spreader 53 will yield and enter the neck of the bottle rather than fracture it, thus reducing breakage, increasing the capacity of the machine and reducing the cost of the valve stem.

It is to be understood that the form of the invention shown herein, is to be taken as a preferred example thereof and that various changes in size, shape and arrangement of parts may be made without departing from the spirit of the invention or the scope of the subjoined claims.

That which is claimed as new and is desired to be secured by Letters Patent is:

1. In a filler valve of the character described, a vent tube having a longitudinal aperture therethrough, said tube having a portion of reduced diameter intermediate the ends thereof, and a spreader element of flexible material mounted in said reduced diameter, whereby damage to the vent stem is reduced.

2. In a filler valve of the character described, a vent tube having a section of reduced diameter thereon, and a readily replaceable spreader element of soft rubber or the like insertable over the tube and mounted on said section of reduced diameter.

GEORGE L. N. MEYER.

REFERENCES CITED

The following references are of record in the file of this patent:

UNITED STATES PATENTS

| Number | Name | Date |
|---|---|---|
| 879,133 | Davis | Feb. 11, 1908 |
| 2,167,123 | Meyer | July 25, 1939 |